Figures 1, 2:
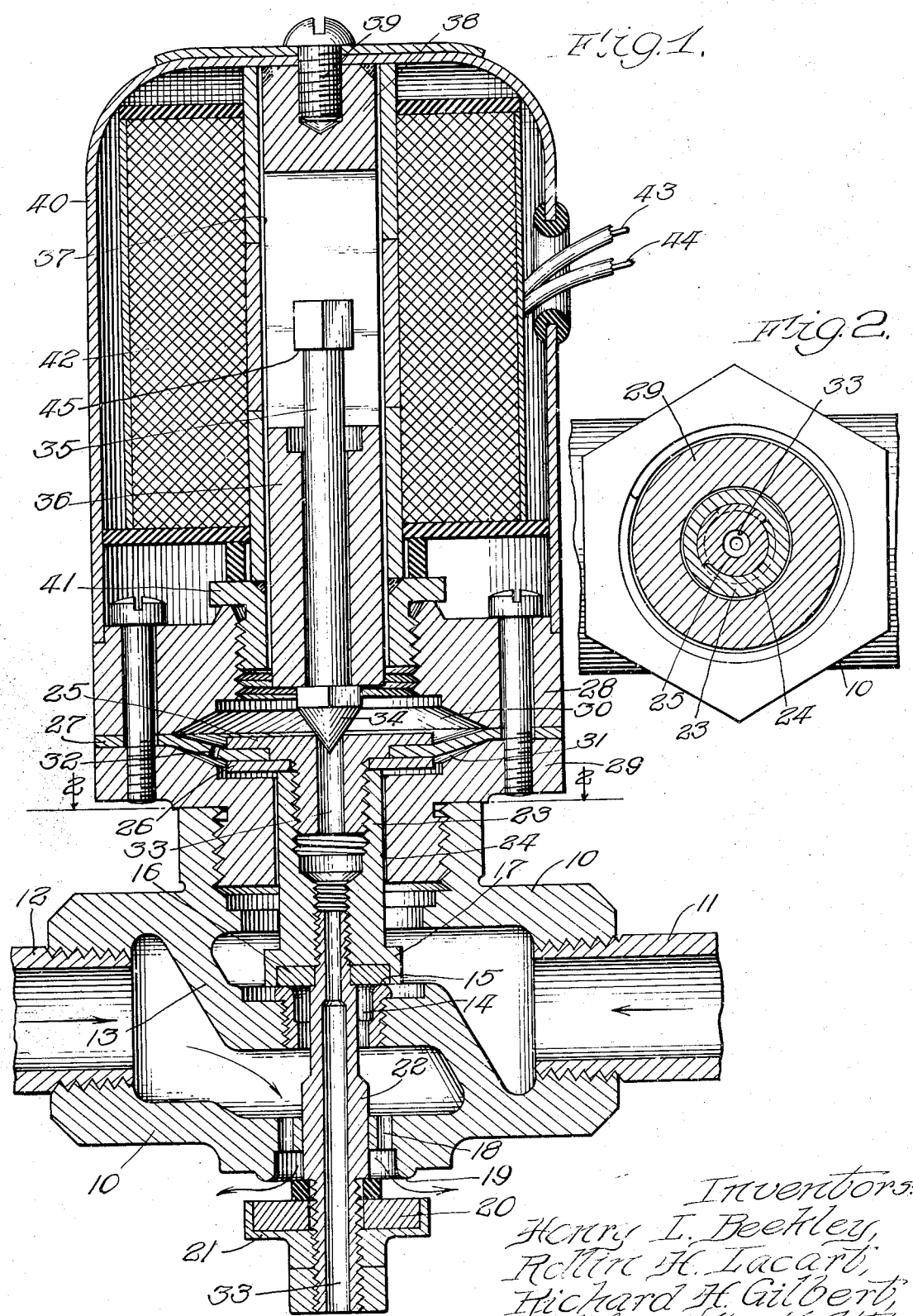

May 18, 1943. H. L. BEEKLEY ET AL 2,319,578

VALVE

Filed Aug. 2, 1941 2 Sheets-Sheet 1

Inventors:
Henry L. Beekley,
Rollin H. Lacart,
Richard H. Gilbert,
By their Attorneys

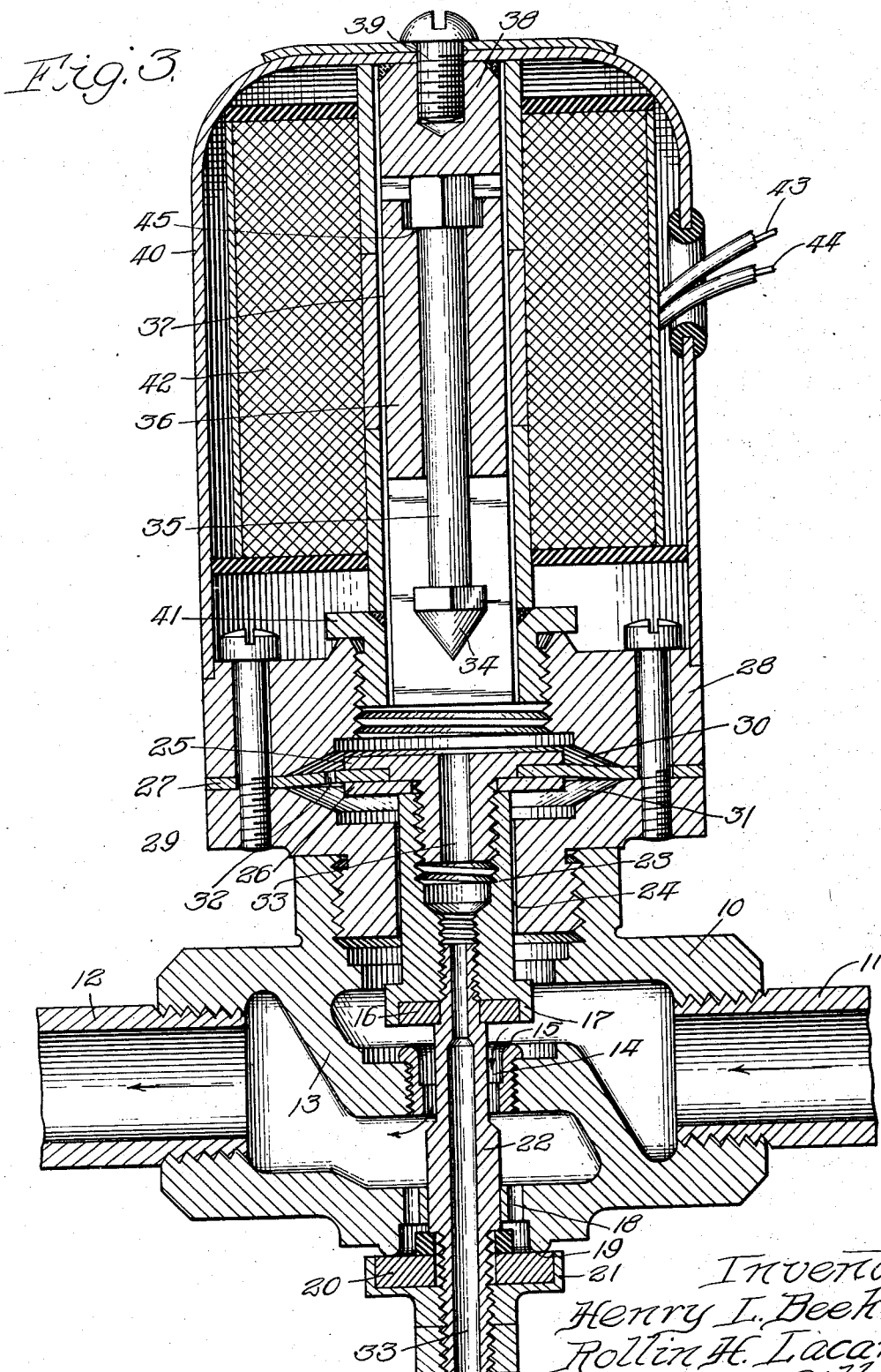

Patented May 18, 1943

2,319,578

UNITED STATES PATENT OFFICE 2,319,578

VALVE

Henry L. Beekley, Glen Ellyn, Richard H. Gilbert, Oak Park, and Rollin H. Lacart, Chicago, Ill., assignors to The Electrimatic Corporation, a corporation of Illinois Application August 2, 1941, Serial No. 405,266

4 Claims. (Cl. 137—139)

This invention relates to a valve, and more particularly to a valve designed to provide remotely controlled actuation for another device, as an oil dispensing pump.

One feature of this invention is that it provides, in a single improved valve adapted for remote control, means for initiating flow of fluid under pressure to a device, teminating such flow, and venting fluid from the device; another feature of this invention is the provision of two flow openings and associated valve members so arranged that when one is in closed position the other is in open position, and vice versa; still another feature of this invention is the provision of improved actuating means for an automatic valve; other features and advantages of this invention will be apparent from the following specification and the drawings, in which:

Figure 1 is a vertical sectional view of a valve embodying our invention, the parts being in inactive or flow blocking position; Figure 2 is a sectional view along the line 2—2 of Figure 1; and Figure 3 is a view similar to that of Figure 1, except that the valve actuating means has been energized and fluid is flowing through the valve.

There are many situations where it is desirable to provide remotely controlled actuation of a device from a source of fluid under pressure, one example of this being in the delivery of a measured quantity of oil or grease from a remote point to a delivery point. That is, it is desirable under some conditions to locate oil drums, for example, in the basement of a garage and to have oil delivered therefrom to a delivery point or spigot adjacent the gas pumps in measured quantities of a quart. The oil pump located near the oil drums in the basement may comprise a cylinder with a pump piston movable therein, a spring urging the piston toward one end of the cylinder and the admission of compressed air to the cylinder on the other side of the piston urging it back. If this pump cylinder is connected to the oil and to the pipe leading to the delivery point by conventional check valves, spring movement of the piston will fill the pump cylinder with the desired measured quantity of oil, as one quart; and admission of compressed air to the other side of the cylinder will drive this quantity of oil up to the delivery point, it being understood that the delivery pipe would always be filled with oil.

In order to conveniently operate such an arrangement from the compressed air available around a garage or greasing station, however, it is necessary that the valve controlling the compressed air be capable of remote control from the delivery point, as by an electric circuit, and that it vent the air from the cylinder after the delivery operation has been completed in order that the pump cylinder may refill with oil. Our valve arrangement disclosed and claimed herewith accomplishes these desired objects in a novel and improved manner.

Referring now more particularly to Figures 1 and 2, the valve comprises a body casting 10 provided with threaded inlet and outlet openings receiving the pipes 11 and 12. The pipe 11 is adapted to be connected to some source of fluid under pressure, as an air storage tank having air at eighty to one hundred pounds per square inch pressure therein; and the pipe 12 is adapted to be connected to the pump cylinder on the side of the piston opposite the spring. The inlet and outlet in the valve body casting 10 are separated from each other by a partition 13 provided with a central opening 14. A seat 15 around this opening is adapted to cooperate with a gasket 16 in a valve member 17, upward movement of the valve member uncovering the opening 14 and permitting compressed air to pass through the valve to the pump cylinder. Whenever the valve member 17 is in the position shown the opening 14 is, of course, closed and no air flows through the valve to the cylinder.

The valve body casting 10 is also provided with another opening, here indicated as 18, on the outlet side of the partition 13. An annular seat 19 around this opening is adapted to cooperate with a gasket 20 in a valve member 21, movement of the valve member toward or away from this seat opening or closing this opening 18.

The openings 14 and 18 are coaxial, being located one above the other in the particular valve shown, and the two valve members 17 and 21 are mounted upon and connected by a rod 22. The spacing between the valve members is greater than that between the seats with which they cooperate, so that when one of the valve members is in closed position the other is in open position and vice versa.

The mechanism providing for remote actuation of the valve members is here shown as mounted on the top of the valve casting 10. The valve member 17 continues up in the form of a piston member 23 movable in a cylinder 24, and carries at its top end a pair of plates 25 and 26. These plates sealingly grip between them the inner edge of an annular diaphragm 27, the outer edge of this diaphragm being sealingly gripped between the flanges 28 and 29 of the actuating mechanism.

The diaphragm 27 is located in a chamber having an upper portion 30 and a lower portion 31, the only communication between these two portions of the chamber being through the orifice 32 in the diaphragm. The rod 22 and the piston 23 are hollow to provide a passageway 33 therethrough, this passageway opening to atmosphere at its lower end beyond the valve member 21. The upper end of the passageway 33 is controlled by a pilot valve 34, this valve being here shown as electrically actuated.

The pilot valve 34 is mounted on one end of a stem 35 longitudinally slidable in a plunger 36 in turn slidable in a tube 37 of non-magnetic material. This tube is sealed at the top, here by a plug 38 held in place by the screw 39 passing through the top of the casing or shell 40. The tube 37 is also sealed at the bottom to a member 41, here shown as rotatably sealed in the flange 28. By this arrangement any pressure present in the upper portion 30 of the chamber around the pilot valve is retained, despite the fact that there is a loose fit between the valve stem 35 and the plunger 36, and between the plunger and the tube 37. The tube 37 is surrounded with a solenoid coil 42 adapted to be energized through the leads 43 and 44. When the solenoid is energized the plunger 36 moves upwardly until its top strikes the shoulder 45 at the top of the valve stem, whereupon it picks up the valve stem and moves it up to the position shown in Figure 3. Whenever the solenoid is de-energized by opening the circuit to the leads 43 and 44 the parts drop back to the position shown in Figure 1.

The piston 23 is preferably a loose fit in its cooperating cylinder 24, with perhaps four to five thousandths of an inch clearance between the cooperating surfaces. This provides a passageway through which compressed air in the inlet pipe 11 works up past the piston 23 into the lower chamber 31. From here the air can pass through the bleeder opening 32 in the diaphragm to the upper chamber 30, but it is trapped in this chamber as long as the pilot valve 34 closes the passageway 33. Under these conditions the pressures in the upper and lower chambers rise to that in the inlet pipe 11, but since the effective area above the diaphragm is greater than that below, the pressures are unbalanced and the piston 23, the rod 22, and the valve members 17 and 21 are positively held in the position shown in Figure 1. Whenever the solenoid is energized and the pilot valve is moved to the position shown in Figure 3, opening the passageway 33, the parts move up because of the fact that fluid in the upper chamber 30 is vented to atmosphere, while there is still pressure in the lower chamber 31. In order to insure this condition the effective area of the bleeder opening 32 in the diaphragm 27 must be less than the annular opening provided by the clearance between the piston 23 and the cylinder 24 in which it moves, while the passageway 33 must have an effective area substantially greater than that of the bleeder orifice 32.

In this way, when the pilot valve 34 is open, the air is vented from the upper chamber 30 faster than it can be supplied through the orifice 32, so that a substantially greater pressure is built up on the under side of the diaphragm to move the parts up to the position shown in Figure 3. In this position, as is already apparent, the opening 14 in the partition is uncovered to permit compressed air to pass from the pipe 11 to the pipe 12, while the opening 18 is covered or closed.

It will be apparent that by the use of our valve it is only necessary to push a button or otherwise close an electrical circuit, by means located at the delivery point, to energize the solenoid 42. Energization of this solenoid moves the valve parts to the position shown in Figure 3, thus permitting flow of compressed air to the pump cylinder and causing delivery of oil or any other desired material. When the pump piston has traveled its full stroke, which will be indicated by cessation of flow of oil, the circuit through the solenoid 42 may be broken by the operation of a limit switch in the pump, or merely by releasing the button. Thereupon the valve parts will return to the position shown in Figure 1, terminating flow of air to the pump cylinder and instead opening the pipe 12 to atmosphere through the discharge opening 18, thus venting the compressed air in the pump cylinder and enabling it to refill for the next operation.

While we have described and claimed certain embodiments of our invention, it is to be understood that it is capable of many modifications. Changes, therefore, in the construction and arrangement may be made without departing from the spirit and scope of the invention as disclosed in the appended claims.

We claim:

1. A valve of the character described for controlling fluid flow, including: a valve body having an inlet and an outlet and a partition separating them, the partition having an opening therethrough; an opening in the valve body on the outlet side of the partition, the openings being axially aligned; a rod coaxial with said openings and longitudinally movable, said rod having a passage therethrough and opening to atmosphere at one end; valve members mounted on the rod on opposite sides of the openings, whereby movement of one valve member to closed position moves the other to open position and vice versa; a diaphragm on the other end of the rod; means for supplying fluid under pressure to one side of the diaphragm; means for venting fluid on one side of the diaphragm, this means including a pilot valve controlling flow through said passage; and means for moving the pilot valve.

2. A valve of the character described for controlling fluid flow, including: a valve body having an inlet and an outlet and a partition separating them, the partition having an opening therethrough; an opening in the valve body on the outlet side of the partition, the openings being axially aligned; a rod coaxial with said openings and longitudinally movable, said rod having a passage therethrough; valve members mounted on the rod on opposite sides of the openings, whereby movement of one valve member to closed position moves the other to open position and vice versa; and actuating means for moving the rod and valve members, this means including a pilot valve controlling flow through the passage.

3. A valve of the character described for controlling fluid flow, including: a valve body having an inlet and an outlet and a partition separating them, the partition having an opening therethrough; an opening in the valve body on the outlet side of the partition; a cylinder in the body, the cylinder and openings being axially aligned; a rod longitudinally movable in said cylinder and passing through both of said openings, said rod having a passage therethrough and opening to atmosphere at one end; valve members mounted on the rod on opposite sides of the openings, whereby movement of one valve member to closed position moves the other to open position and vice versa; a diaphragm on the other end of the rod; means for slowly supplying fluid under pressure from the inlet to one side of the diaphragm; means providing for a flow of fluid from said side of the diaphragm to the other side, this flow being more restricted than the supplying flow; means for venting fluid from said other side of the diphragm at a rate faster than the flow from one side to the other, this means including a pilot valve controlling flow through said passage; and means for moving the pilot valve, this means being operable from a remote point.

4. A valve of the character claimed in claim 3, wherein the fluid being controlled is a gas at high pressure, the rod has a slightly loose fit in the cylinder, and the means for supplying fluid from the inlet to one side of the diaphragm includes the annular space between the cooperating rod and cylinder walls.

HENRY L. BEEKLEY.
RICHARD H. GILBERT.
ROLLIN H. LACART.